United States Patent
Van Stelten

[15] 3,655,434
[45] Apr. 11, 1972

[54] PROCESS FOR TREATING RUBBER SURFACES

[72] Inventor: Henry Van Stelten, 335 Skycrest Ave., La Habra, Calif. 90631

[22] Filed: June 25, 1969

[21] Appl. No.: 836,637

[52] U.S. Cl. ..............................117/139, 106/2, 252/550, 252/554
[51] Int. Cl. ..........................................C08c 17/24
[58] Field of Search ............... 106/2, 13; 117/139; 252/161, 252/DIG. 14, 550, 554

[56] References Cited

UNITED STATES PATENTS

| | | | |
|---|---|---|---|
| 2,292,097 | 8/1942 | Vollmer | 106/13 |
| 3,245,912 | 4/1966 | White | 106/13 X |

*Primary Examiner*—Lorenzo B. Hayes
*Attorney*—Fowler, Knobbe & Martens

[57] ABSTRACT

A process for treating the surfaces of rubber tires for vehicles comprising applying to said surfaces a composition containing, by weight:

| | |
|---|---|
| glycerine | 3 – 8% |
| alcohol | 20 –30% |
| stabilizer | .05– 5% |
| coloring agent | .01– 1% |
| rust inhibitor | up to 2% |
| water | balance |

2 Claims, No Drawings

PROCESS FOR TREATING RUBBER SURFACES

This invention is directed to a surface treating composition for treating the outer side walls of pneumatic tires such as automobile tires to give them a renewed appearance.

It is well known that if automotive tires stand for long periods of time out of doors in the sunlight the color fades or degrades producing a gray color rather than the fresh black color of new tires. If the tire surfaces degrade sufficiently, loss of color is not the only result. For example the tires may form minute cracks along the side walls.

There presently is no commercially available, effective surface treating composition which will prevent color degradation of the side walls of automobile tires and the surfaces of other such rubber products, that will assist in prolonging their life and that will provide color degraded rubber materials with a new, attractive appearance. Such a surface treating composition should be easy to apply and should retain its effectiveness through a broad range of temperatures without becoming tacky or chipping or peeling.

This invention is a composition which is effective in treating the surfaces of degraded black rubber products to restore their original, new appearance and to protect the surfaces from any further degradation. The composition contains glycerine, a bluing agent, a stabilizer, an alcohol solvent, a rust inhibitor, and water.

Other agents such as a water repellent may be added to prolong the effect of the composition, if desired.

The stabilizer has been found to be extremely important to obtain proper coloration of the degraded rubber surfaces. The stabilizer is a water soluble surfactant which is a water soluble alkyl aryl polyether alcohol identified as an octyl phenoxy polyethoxy ethanol containing ethylene oxide. Any of the alkyl aryl polyether alcohols, sulfonates, and sulfates can be used, however, as the stabilizers of the composition of this invention such as the octylphenol series of Triton non-ionic surface active agents produced by Rohm and Hass. Triton X–100, the preferred stabilizer, is a water-soluble isooctyl phenoxy polyethoxy ethanol containing ten moles of ethylene oxide. Triton X–100 has a viscosity of 240 cp at 25° C (Brookfield), a pH of 6-8 (5% solution), and a specific gravity of 1.065 at 25° C average. Additionally any water soluble surface active agents such as the alkali metal salts of alkyl sulfates or sulfonates having from 12–22 carbon atoms can be used to stabilize the coloring agent in suspension in the composition.

It has been observed consistently that both the glycerine and the stabilizer must be present to obtain the beneficial effects of the surface treating composition of this invention. Although stabilizers have been found effective in bringing about the beneficial results of this composition, they do not appear to be acting in the manner normally associated with such stabilizers, i.e. stabilizing colloidal dispersions. Apparently the stabilizer interacts with the glycerine or the glycerine and the rubber being treated to bring out the original color of the rubber.

Any alcohol which is relatively quick drying can be used as the solvent and carrier of this invention. For example methyl, ethyl, propyl, butyl, isopropyl, isobutyl and the dihydric alcohols ethylene glycol or trihydric alcohols used in antifreeze have all been found to be satisfactory. Isopropyl alcohol is preferred, however, because of its relatively low cost and rapid drying characteristics. The alcohol functions as a carrier and solvent and is used with the water to promote rapid drying of the composition. Normally the alcohol detrimentally affects the rubber structure but in the presence of glycerine it has been found that the effect of the alcohol on the rubber surface is not detrimental.

Up to 10 percent by weight of a volatile organic such as the lower molecular weight ketones and more specifically acetone may be added to enhance drying of the composition. The dryer can be omitted, however.

The barium and magnesium salts present in water tend to cause a white salt precipitate to form when the water and alcohol or ketone carriers have been evaporated. Thus soft water is preferred for use in the composition.

Any compatible rust inhibitor may be added to the solution to prevent it from attacking the rims of automobile wheels when it is sprayed or painted on the surface of the tire and to prevent it from attacking the container in which the solution is retained. The preferred rust inhibitor, however, is a mixture comprising 5 percent by weight triethanolamine, 10 percent by weight diethylene glycol, 30 percent by weight sodium nitrate and the balance water. The rust inhibitors may also be alkali metal bichromates such as sodium or potassium bichromate. These materials also act to prevent oxidation of the stabilizer. Other materials which are suitable for use as a rust inhibiting agent include alkali metal nitrites and a mixture of triethanolamine and phosphoric acid. Substantially any conventional rust inhibiting agent or compound may be utilized, however, provided that it is compatible with the other components of the composition and does not enter into any chemical interaction with the other ingredients of the composition which would be detrimental to the overall effect of the surface treating composition.

The bluing agent is preferably a bluing such as indigo. Blue iron ferrocyanide pigments or other such synthetic bluing agents can be used. The white walls are bleached to a whiter color and the black sidewalls are clearly improved by the presence of a small quantity of the bluing agent.

The broad range and preferred composition of the surface treating composition of this invention are set forth in the following table:

TABLE I

| Component | Percent by Weight | |
|---|---|---|
|  | Broad | Preferred |
| glycerine | 3 – 8% | 4 – 6% |
| alcohol | 20 – 30% | 24 – 26% |
| stabilizer | 0.05 – 5% | 0.05 – 3% |
| drying agent | up to 10% | 6 – 8% |
| rust inhibitor | up to 2% | 0.1 – 1% |
| water repellent | up to 1% | about 0.1% |
| water | balance | balance |

The composition of this invention is preferably applied to the surfaces of the tire or rubber product being treated by spraying from an effective aerosol spray. For example the spray may be a pressurized cannister having a plastic bag of the composition held therein so that the composition is in communication with the spray nozzle. When the composition is applied evenly to the new surfaces or the color degraded surface of the rubber product and especially to the surfaces of an automobile tire, the tire immediately takes on the appearance of a new tire having a restored original color. Additionally, the treated surface is more resistant to future color degradation or cracking.

It should be noted that the composition of this invention does not cause the surface of the rubber being treated to have the appearance of being painted but, rather, restores its original appearance. The surface treatment composition when dried is not glossy or shiny but rather only provides a rapidly drying surface coating which is quickly absorbed into the degraded rubber and brings out the original color and appearance of the rubber before it was degraded. On new tires the composition forms a thin protective outer coating which seals the tire surfaces, but does not appear to be absorbed.

The composition of this invention is prepared by first adding the bluing into the water base then mixing in the glycerine and alcohol. During the addition of the glycerine and alcohol and thereafter, the composition is preferably agitated at a rapid rate. For example in a 600 gallon drum a 24 inch, two bladed rotary fan mixer rotating at a speed of about 2–300 rpm has been found to be satisfactory to solubilize the soluble constituents and to keep all of the other materials in suspension.

After the alcohol and glycerine have been added, the stabilizer and preservative or the surfactant are then added to the solution in the quantities used. Finally the rust inhibitor is added. Generally the solution is agitated for a period of 1–20 minutes thereafter to maintain a good homogenous mixture and to solubilize all of the glycerine and coloring material which can be dissolved in the alcohol and water of the composition.

The following examples are submitted to more clearly illustrate the manner in which the surface treating composition of this invention is prepared and used.

EXAMPLE 1

A 128 oz. sample of the surface treating composition was prepared by adding 83 oz. of water to a drum having a rotating fan blade mixer near the bottom thereof. A bluing agent dilute solution (one drop concentrate per gallon of water) was first added in the amount of about 1 oz. and then 4 oz. of glycerine were added while the fan blade was rotating at its normal speed. Thirty-two oz. of isopropyl alcohol were then added to the mixed composition and 2 oz. of Triton X–100 were added. A rust inhibitor comprising 5% triethanolamine, 10% diethyl glycol, 30% sodium nitrate and the balance water was then added in the amount of about 1 oz. Mixing of the composition was allowed to continue for about 15 minutes so that all of the glycerine and Triton X–100 were dissolved in the water and alcohol and so that the coloring agent was suspended in a stabilized colloidal suspension in the system.

The composition prepared in accordance with Example 1 was then painted on the side wall surfaces of a color degraded automobile tire. The surfaces were dried within a period of 5 minutes and the original black appearance of the tire was restored. The side walls retained this appearance for several weeks thereafter even though exposed to sunlight in continuous normal use.

EXAMPLE 2

A composition was prepared in accordance with Example 1 except that 4 oz. of Triton X–45 was used in the place of Triton X–100. The mixing procedure was the same as for Example 1.

This composition prepared in accordance with Example 2 was applied to the surface of a color degraded black rubber tire side wall. Rejuvenation of the original appearance of the side wall was comparable to that of Example 1.

Triton X–45 is a non-ionic surfactant chemically indentified as an octyl phenoxy polyethoxy ethanol and contains 5 moles of ethylene dioxide. It has a flash point of 262° C, a viscosity of 240 cp at 25° C, a specific gravity of 1.030 to 1.050 at 25° C and a density of 8.7 lbs./gal.

EXAMPLE 3

The composition in accordance with Example 2 was prepared with the exception that ethyl alcohol was used in the place of the isopropyl alcohol to form a solvent and quick drying agent for the composition. This composition was then painted on the surface of a black side wall rubber tire which had been color degraded by excessive exposure to sunlight. The results were comparable to those of Example 1.

EXAMPLE 4

A composition was prepared as in Example 1 and 32 oz. of ethylene glycol were used in the place of isopropyl alcohol. The ethylene glycol contained a small amount of a metal soap antioxidant (primarily sodium laureate). The composition was sprayed on the surfaces of an automobile tire side wall with results comparable to Example 1.

EXAMPLE 5

The 4 oz. of Triton X–45 of the composition of Example 2 were replaced by 3 oz. of Triton X–100. Noticeably better results were obtained using the Triton X–100.

The compositions prepared in Examples 1–5 produce superior results in restoring the original appearance of a degraded black rubber tire side wall. Although in each case the tires had a white strip along the side wall no detrimental effect was observed by spraying the composition on the white side wall and a noticeable improvement in brightening of the white portion was observed. It has been found that if the water used in preparing the composition is not softened a precipitate may be formed which detracts from the appearance of the tire and thus it is preferred that soft water be used in every preparation of the composition of this invention.

It has also been found that the composition of this invention is particularly adaptable for use in spray cans utilizing pressurized plastic bags to isolate the aerosol gas from the composition. It does not have a detrimental effect on the rims of automobile tires or on other metal parts of the automobile which it may contact when used.

What is claimed is:

1. A method for treating the external surfaces of rubber articles comprising:

| providing a rubber surface; coating said surface with a composition comprising by weight: | |
|---|---|
| glycerine | 3 - 8% |
| alcohol containing 1–4 carbon atoms | 20 - 30% |
| a water-soluble surfactant selected from the group consisting of alkali metal salts of alkyl sulfonates or sulfates having from 12–22 carbon atoms and the alkyl aryl polyether alcohols, sulfonates and sulfates | 0.05 - 5% |
| water | balance |

2. A method as defined in claim 1 wherein said alcohol is isopropyl alcohol, said surfactant is a water soluble isooctyl phenoxy polyethoxy ethanol containing 10 moles of ethylene oxide and said surface is coated by spraying said composition thereon.

* * * * *